US011878335B2

(12) United States Patent
Lozano Bonet

(10) Patent No.: US 11,878,335 B2
(45) Date of Patent: Jan. 23, 2024

(54) FINE BLANKING PRESS AND METHOD FOR OPERATING THE SAME

(71) Applicant: Lapmaster Wolters GmbH, Rendsburg (DE)

(72) Inventor: Jose Lozano Bonet, Rendsburg (DE)

(73) Assignee: Lapmaster Wolters GmbH, Rendsburg (DE)

( * ) Notice: Subject to any disclaimer, the term of this patent is extended or adjusted under 35 U.S.C. 154(b) by 395 days.

(21) Appl. No.: 16/714,246

(22) Filed: Dec. 13, 2019

(65) Prior Publication Data

US 2020/0188983 A1 Jun. 18, 2020

(30) Foreign Application Priority Data

Dec. 13, 2018 (EP) .................................... 18212195

(51) Int. Cl.
*B21D 28/00* (2006.01)
*B21D 28/34* (2006.01)
(Continued)

(52) U.S. Cl.
CPC ........... *B21D 28/002* (2013.01); *B21D 28/34* (2013.01); *B30B 15/0064* (2013.01); *B30B 15/16* (2013.01); *B30B 15/22* (2013.01)

(58) Field of Classification Search
CPC .. B21D 28/002; B21D 28/34; B30B 15/0064; B30B 15/16; B30B 15/22
(Continued)

(56) References Cited

U.S. PATENT DOCUMENTS 3,107,567 A 10/1963 Linder
3,570,343 A * 3/1971 Wolnosky ............. B21D 28/16 83/639.1
(Continued)

FOREIGN PATENT DOCUMENTS

CN 106536081 A 3/2017
DE 102014214739 B3 12/2015
(Continued)

OTHER PUBLICATIONS

EP Application No. 19211536.8 filed Nov. 26, 2019; Lapmaster Wolters GmbH; European Search Report dated May 12, 2020; 8 pages.
(Continued)

*Primary Examiner* — Jimmy T Nguyen
*Assistant Examiner* — Smith Oberto Bapthelus
(74) *Attorney, Agent, or Firm* — Barclay Damon LLP

(57) ABSTRACT

The disclosure pertains to a fine blanking press comprising a first press unit comprising a first press drive for driving the first press unit in a first driving movement during a fine blanking process step, and a second press unit wherein the second press unit is driven in a second driving movement at least partially during the first driving movement of the first press unit, and wherein a force control unit exerts a counter force against a force exerted by the first press unit during its first driving movement, and wherein the force control unit comprises at least one sensor and a controller operative to receive measuring data collected by the at least one sensor, and wherein the controller is configured to carry out a closed loop control on basis of the received measuring data. The disclosure further pertains to a method for operating a fine blanking press.

27 Claims, 4 Drawing Sheets

(51) Int. Cl.
*B30B 15/16* (2006.01)
*B30B 15/22* (2006.01)
*B30B 15/00* (2006.01)

(58) Field of Classification Search
USPC .................................................... 100/269.01
See application file for complete search history.

(56) References Cited

U.S. PATENT DOCUMENTS

| | | | | |
|---|---|---|---|---|
| 4,024,747 | A * | 5/1977 | Bergmann | B21D 43/027 206/820 |
| 4,295,399 | A * | 10/1981 | Finsterwalder | B21D 43/287 83/734 |
| 10,328,478 | B2 | 6/2019 | Erlenmaier et al. | |
| 2011/0226141 | A1* | 9/2011 | Kohno | B21D 24/14 100/269.01 |
| 2017/0013519 | A1 | 5/2017 | Erlenmaier et al. | |

FOREIGN PATENT DOCUMENTS

| | | | | |
|---|---|---|---|---|
| EP | 1232810 | A1 * | 8/2002 | B21D 5/02 |
| EP | 2158982 | A1 | 3/2010 | |
| EP | 3115191 | A1 | 1/2017 | |

OTHER PUBLICATIONS

CN 201911285351.0; filed Dec. 13, 2019; First Office Action; dated Aug. 23, 2022 (9 pages).
CN 201911285351.0; filed Dec. 13, 2019; English translation of First Office Action; dated Aug. 23, 2022 (9 pages).

* cited by examiner

FINE BLANKING PRESS AND METHOD FOR OPERATING THE SAME

CROSS REFERENCE TO RELATED DISCLOSURE

This application is based upon and claims priority to, under relevant sections of 35 U.S.C. § 119, European Patent Application No. 18 212 195.4, filed Dec. 13, 2018, the entire contents of which are hereby incorporated by reference.

BACKGROUND

Fine blanking presses allow blanking parts for example from sheet metal with high quality and flexibility with regard to the design of the parts. Fine blanking presses usually comprise a press ram and a counter unit, such as a working table, arranged opposite the press ram. A blanking tool is arranged between the blanking ram and the working table. The blanking tool can comprise, for example, one or more press plates, or ejectors, directly connected by transfer pins, to a press cushion of the press ram. Alternatively a press cushion of the working table connected to any other cushion or actuator integrated within the tool itself may be used in combination with one or more press punches or press dies.

During a fine blanking process step, the press ram is driven in a driving movement against the working table wherein sheet metal to be processed is held between the press ram and the working table. During this fine blanking process step, the press ram pushes the working table along its driving direction so that the press ram can move relative to the press plates, press punches, or press dies. When blanking a part from the process material, for example, press punches can move relative to the press ram. Usually, the blanking tool is provided with impingement means, for example, an impingement ring, like a V-ring, for securely holding the process material in place. The fine blanking process can also comprise progressive, transfer, rotary or other tooling process steps, wherein a part is blanked for performing subsequent movements of the press ram and working table.

Fine blanking presses are else known, for example, from EP 2 158 982 A1 or EP 3 115 191 A1. In EP 2 158 982 A1 it is suggested to connect a cylinder/piston unit driving a counter unit to two separate hydraulic pressure cycles. In order to avoid undesired pressure peaks when the blanking tool contacts the process material, hydraulic fluid is discharged into a tank via one of the separate hydraulic pressure cycles. To reduce the cutting impact in a fine blanking press, EP 3 115 191 A1 suggests measuring the position of a main piston, driving the main press ram and the working pressures in the first and second pressure chambers of the main piston, determining a force maximum in the second pressure chamber, and applying force to a top dead center position of the main piston. EP 3 115 191 A1 also suggests adjusting the pressure in the first pressure chamber, applying force to a bottom dead center position of the main piston such that the working pressure in the first pressure chamber is increased, to generate a force which counteracts the cutting impact. The force application of these known fine blanking processes is slow, i.e., only active after reaching the maximum force value in the second pressure chamber, and maintains the maximum counter force value in the first pressure chamber only until the end of the driving movement of the press components.

The press ram exerting the main blanking force can, for example, be driven by a hydraulic cylinder. During its driving movement the press ram can drive other press units, such as cushions. The cushions can also be provided with a hydraulic cylinder which may be actuated by the movement of the press ram. In some fine blanking presses accumulators, such as gas cylinders filled with, for example, nitrogen, actuation of the hydraulic cylinder of the cushion during the driving movement of the press ram compresses the gas in the accumulator. In this way, part of the energy applied during the fine blanking process can be collected and used for the next press cycle. This makes the fine blanking press energy efficient. Any cylinders used may be single acting or double acting cylinders.

However, undesired secondary effects are associated with this type of fine blanking press. For example, the increasing pressure of the gas in the accumulator leads to an increasing hydraulic fluid pressure in the press system such that a force exerted by the cushion also increases over the stroke of the press ram. Therefore, a higher press ram force is necessary, and the press ram force needs to be increased over a stroke of the press ram. This in turn leads to higher press power consumption. Also hydraulic fluid in the press system has an increased temperature due to the increased fluid pressure. This in turn requires bigger cooling units and again additional power consumption. The necessary increase of press force during the press ram stroke can also lead to a stronger "locking" of the process material to be blanked due to higher pressure applied by the cushion, and in particular impingement means of the cushion. Consequently, the locked process material cannot flow and blanking stress rises in the area surrounded by the impingement means, such as a V-ring. This can lead to the process material losing flatness. This in turn needs a further increased force by the cushion in order to maintain the processed material as flat as possible. This again leads to an even higher necessary press ram force and higher power consumption. The locking of the process material also leads to higher tool working temperature, higher tool component stress due to higher forces applied in higher temperature, tools having to support higher forces, and a risk of tool damage due to higher tool stress. Generally, tool components are subjected to higher wear and tool life is reduced. Tool maintenance intervals are accordingly shorter which increases costs and decreases productivity. Further, lubrication needs to be increased due to higher friction values during the fine blanking process.

Based on the above explained prior art it is an object of the disclosure to provide a fine blanking press and method of the above explained type wherein the above explained problems can be overcome.

BRIEF SUMMARY OF THE DISCLOSURE

The disclosure pertains to a fine blanking press comprising a first press unit, comprising a first press drive for driving the first press unit in a first driving movement during a fine blanking process step, and further comprising a second press unit wherein the second press unit is driven in a second driving movement at least partially during the first driving movement of the first press unit.

The first press unit is selected from the group comprising, but not limited to, press rams, press cushions and chopping units. The second press unit is selected from the group comprising, but not limited to, press rams, working tables, press cushions and press plates.

The disclosure further pertains to a method for operating a fine blanking press wherein a first press unit, selected from the group comprising, but not limited to, press rams, press cushions and chopping units, is driven in a first driving movement during a fine blanking process step, and a second press unit selected from the group comprising, but not limited to, press rams, working tables, press cushions and press plates, is driven in a second driving movement at least partially during the first driving movement of the first press unit.

For a fine blanking press of the above explained type, the disclosure solves the object of the invention in that a force control unit is provided for exerting a counter force against a force exerted by the first press unit during its first driving movement, and in that the force control unit comprises sensors and a controller receiving measuring data collected by the sensor, wherein the controller is configured to carry out a closed loop control on basis of the received measuring data.

For a method of the above explained type, the disclosure solves the object of the invention in that during the first driving movement of the first press unit a counter force is exerted against a force exerted by the first press unit, and in that sensors collect measuring data, wherein a closed loop control is carried out on basis of the measuring data.

An inventive fine blanking press comprises one or more first press units, such as one or more press rams, one or more press cushions and/or one or more chopping units and/or others, and one or more second press units, such as one or more press counter rams, one or more working tables, one or more press cushions and/or one or more press plates, and/or others. For example one or more first press units could work against one or more second press units, such as one or more cushions. Opposite the first press unit, for example such as a press ram, for example a working table can be arranged. A press drive drives the first press unit, such as a press ram exerting the main blanking force, along a first driving movement or stroke during a fine blanking process step. The first press unit may carry out different movements, for example a first fast approaching movement, a second blanking or cutting movement and a third return movement. Additional movements with different movement speeds may be introduced for example in between the explained movements. In one or more, for example all of the movements, the inventive force control may be carried out. The process material is clamped by means of a fine blanking tool arranged between for example the press ram and a working table arranged opposite the press ram. The fine blanking tool serves to blank parts out of the process material fed to the process zone between the press ram and the working table, and can comprise one or more press punches, dies or other components. For example in the press two or more cushions can be arranged opposite each other. One of the cushions can comprise impingement means, such as an impingement ring, like a V-shaped ring (V-ring), for securely holding the process material during the blanking process. Press punches movable relative to the cushions can be provided for blanking parts out of the process material. A feeding device of the fine blanking press feeds the process material to be processed into the process zone between the press ram and the working table. The process material is typically sheet metal. It can be present as a coil that is unwound from a reel and fed flat to the process zone, where it is blanked by the blanking tool.

According to the disclosure a force control unit is provided for controlling a counter force exerted against a force exerted by the first press unit during its first driving movement, in particular at all times during its first driving movement. This counter force may be generated by the second press unit, in particular a second press drive of the second press unit, as will be explained below. However, this counter force may also be generated by the first press unit itself, for example by pressurizing a cylinder cavity of a hydraulic cylinder of the first press drive acting against the first driving movement. The force control unit controls the corresponding units and/or actuators for exerting the counter force. Thus, the first press unit(s) and/or the second press unit(s) may be controlled by the inventive force control unit, and thus may have a force control. The force control unit can comprise force control subunits, each controlling at least one of several first and/or second press units. Also, the force control unit may comprise a joint unit, controlling several, for example all of several first and/or second press units. Through this counter force the first press unit is loaded between the driving force of the first press drive driving the first press unit in the first driving movement and the counter force acting against this driving force. This loading allows for a very fast and precise control of the movement of the first press unit. The counter force may already be applied before the first press unit starts its first driving movement. The counter force may also still be applied during a return movement of the first press unit, such as a press ram. It may be applied against the first and/or second press units, such as cushions, at any of the explained times and durations. Of course, the number of forces that a given press unit may exert are not limited.

As in known fine blanking presses the second press unit is driven in a second driving movement at least partially, in particular completely, during the first driving movement of the first press unit, such as the press ram exerting the main blanking force. As already explained the second press unit can for example be a press cushion which may exert a "braking" force against the force exerted by the press ram. The force exerted by the cushion is thus a counter force against the force exerted by the press ram. Such a counter force can also comprise an impingement force, in the case of an impingement ring, like a V-shaped ring or V-ring, a V-ring force, to press the impingement means, such as a V-ring, into the process material around the perimeter of the part to be blanked, and thus to clamp the process material for blanking The counter force can also be a counter force exerted by the cushion to maintain the process material to be blanked in a flat condition for blanking Press cushions can be so called active cushions or so called passive cushions. Active cushions are preloaded by a suitable actuator to exert the desired force already before the press ram exerts a force due to its first driving movement. For example in hydraulically driven cushions the preloading can be effected by applying a suitable hydraulic pressure before the press ram starts its stroke. A passive cushion on the other hand is not preloaded such that a force exerted by the cushion will build up upon beginning of the first driving movement of the press ram and the corresponding force of the press ram. Consequently, in passive cushions there can be a short time delay before the desired force is exerted by the cushion, wherein such a delay is avoided in active cushions. On the other hand passive cushions are of particular simple construction. If it is referred to cushions in this patent application this can comprise active or passive cushions. The inventive force control also allows to decrease the cutting force exerted as well as the counter force exerted accordingly to the remaining sheet thickness to be cut during the fine blanking process. This allows energy saving as well as press components stress reduction. The power consumption is lower as only a small amount of pressure and for example hydraulic fluid flow is lost during the cutting part of the cycle.

The second press unit can also be a different unit than a cushion, for example a working table, a press plate, a press punch, also for ejecting a process part, or a chopping unit arranged downstream of the process zone to chop the scrap process material after blanking As explained the force exerted by the second press unit can generally be any type of force, such as a counter force, including an impingement or V-ring force, an ejection force to eject a produced part, a ram force exerted by a press ram, a chopping force for chopping scrap material, or the like.

Further according to the disclosure the force control unit comprises at least one sensor, for example sensors, and a controller receiving measuring data collected by the at least one sensor, wherein the controller is configured to carry out a closed loop control on basis of the received measuring data. In this manner it is possible to precisely control for example movement(s) and/or force(s) of component(s) of the fine blanking press and to achieve full control over the process and its forces at any time. To this end different sensors can be provided, e.g. position sensors for hydraulic pistons and/or movable press units and/or temperature sensors and/or force sensors and/or pressure sensors and/or flow sensors and/or viscosity sensors, e.g. for measuring hydraulic pressure and/or flow volume and/or viscosity in hydraulic cylinders and/or hydraulic lines. For example each cavity of a hydraulic cylinder may be provided with its own pressure sensor for measuring the pressure in the respective cavity. Measuring data of these sensors can be fed to the controller of the force control unit such that a closed loop control, for example a closed loop force control, can be carried out on basis of the measured sensor data.

According to an embodiment the first press drive may comprise a hydraulic cylinder, wherein the force control unit comprises at least one control valve, preferably a proportional control valve, which control valve is configured to connect the barrel side and/or the piston side of the hydraulic cylinder to a tank for hydraulic fluid and/or which control valve is configured to connect the barrel side and the piston side of the hydraulic cylinder to each other. If the first press unit is for example a press ram the hydraulic cylinder may be the main ram cylinder driving the movement of the press ram. One or more such control valves may be provided. The control valve may be controlled by a controller of the force control unit. However, such a controller, connecting for example the cylinder cavities of a hydraulic cylinder and a tank, may thus also represent a control valve itself The hydraulic fluid may for example be oil. The force control unit may comprise for example exactly one control valve or for example two control valves. This would be one example of an open force control system according to the disclosure. The connection of the hydraulic cylinder to the hydraulic fluid tank is effected according to the control status of the control valve, in particular the flow volume it lets pass to the tank according to its control of the controller. Of course, other open force control systems would also be possible according to the disclosure.

The barrel side and the piston side may (already) be pressurized before (and during) the first driving movement of the first press unit, in particular at all times during the first driving movement of the first press unit. By pressurizing the barrel side and the piston side already before the first driving movement of the first press unit the counter force acts before any movement of the first press unit. By pressurizing the cylinder cavities at all time the position of the first press unit along the complete movement is maintained and controlled with very high accuracy since the compressibility ratio of the hydraulic fluid is already compensated. This also allows faster reactions of the press unit movements.

The above explained embodiments allow for a particular fast and precise force control. The pre-pressurizing of both cylinder cavities pre-compresses the hydraulic fluid such that no reaction time is caused due to a necessary flow volume of the hydraulic fluid or the compressibility of the hydraulic fluid. Movement of the cylinder and thus for example a press ram can be initiated by generating a small pressure drop between cylinder cavities though the corresponding controlled valve. Since the hydraulic cylinder can be directly mechanically connected to a ram plate of a press ram movement of the press ram can be initiated with no relevant delay. The barrel side and the piston side may further be connected to each other by the control valve, in particular at all times during the first driving movement of the first press unit. By connecting the cylinder cavities to each other through the control valve and thus letting the hydraulic fluid flow between the cavities the pressure is maintained in the control system and need not be rebuilt each time a force shall be built up. The force control is thus quicker and more efficient than in the above explained prior art. Also, the above embodiments allow movement of the first press unit, such as a press ram, through the force control unit in both driving directions, by slightly depressurizing the corresponding cavity. More specifically, movement of the first press unit need not rely on gravity.

According to a further embodiment the at least one sensor may comprise at least one position sensor measuring the position of the first press unit, such as for example a press ram, and in that the controller is configured to carry out a closed loop control of the position of the first press unit on basis of the measured position data. The position sensor can for example be an encoder or the like. In this manner the position of the first press unit, and potentially as a result the force exerted by the first press unit, can be controlled precisely.

According to a further embodiment the first press drive can be configured to drive the first press unit during a fine blanking process step in different movement steps, namely an initial approach step, during which the first press unit approaches the process material to be fine blanked, a fine blanking step, during which the process material is fine blanked, and a return step, during which the first press unit returns to its initial position before the initial approach step. The approach step may be initiated from a rest position of the first press unit and may comprise a movement of the first press unit with high initial acceleration, high speed and low force movement. It serves to approach the process material to be fine blanked quickly. Subsequent to the initial approach movement the fine blanking step may follow which comprises the actual fine blanking of the process material and thus comprises a low speed and high force movement. After the fine blanking step the return step follows, moving the first press unit back to its initial position and thus comprising high acceleration and high speed and low force movement again. Between the different steps additional steps may be carried out. For example, between the approach step and the fine blanking step a sensoring step may be carried out, also with high speed and low force movement, but with a lower speed than in the approach step. This sensoring step may be beneficial to better support tool safety reaction time, in particular to avoid tool breakage due for example to a too fast approach to the process material. The initial approach step and the fine blanking step and, if present, the sensoring step together form the first driving movement.

The controller may further be configured to carry out the closed loop control such that the first press unit is driven with a constant speed at least during the fine blanking step. For fine blanking the process material a high force is necessary, initially at the beginning of the fine blanking step when the process material is first plastically deformed. Subsequently, the process material breaks, in particular for example steel fibers of a steel process material start to break. At this point the required blanking force drops drastically. With no additional measures this leads to a massive increase in speed of the first press unit. A list of undesired effects can occur due to this sudden drop in force and sudden rise in movement speed, for example an oscillating movement generated by the released energy through the tool components and the press frame. This can lead for example to reduced tool lifetime or even tool damage, and press frame fatigue. Also this can have a negative impact on the quality of the fine blanked part and causes undesired noise.

According to the above embodiment these issues are overcome by carrying out a closed loop control, in particular such that the first press unit is driven with a constant speed at least during the fine blanking step based on measuring data of the at least one position sensor measuring the position of the first press unit, be this directly, or indirectly, for example through measuring the position of a hydraulic cylinder. Through controlling the speed of the first press unit to be constant the force exerted by the first press unit is automatically adapted to the blanking process such that the blanking force is adjusted and reduced "just in time" while blanking the process material, especially towards the end of the blanking step when the process material breaks and the required force reduces drastically, in order to maintain the constant speed. The result is a decreasing force curve along the blanking process, reaching a minimum force value at the end of the blanking step, which minimum force value is equal to the required force to move the first press unit, such as a press ram or ram plate, and potential unit(s) mechanically connected to the first press unit, such as the blanking tool. In this manner, undesired effects due to a sudden drop in required force towards the end of the blanking step, and sudden increase in movement speed, such as limited tool lifetime or tool damage, press frame fatigue, and reduced quality of the blanked part, are reliably avoided. Rather, tool and press components stress is minimized and blanked part quality is maximized. In particular, also the critical edges of the produced tool parts reach a strongly improved quality. Also, the fine blanking process is more silent because noise due to the explained oscillation effects can be entirely avoided.

According to a further embodiment the at least one sensor comprise at least one force sensor measuring the force exerted by the first press unit and/or the counter force controlled by the force control unit, and in that the controller is configured to carry out a closed loop control of the force exerted by the first press unit and/or the counter force controlled by the force control unit on basis of the measured force data. In this manner the forces exerted by the first press unit and/or the force control unit can be controlled reliably and precisely.

According to a further embodiment the force control unit is configured to control a force exerted by the second press unit as the counter force against the force exerted by the first press unit during its first driving movement. The force control unit may further be configured to control a force exerted by the second press unit independently from the force exerted by the first press unit during its first driving movement, in particular at all times during the first driving movement of the first press unit. According to a further embodiment the second press unit may be driven in the second driving movement at least partially by the first driving movement of the first press unit.

Consequently, according to these embodiments, and unlike in the above explained prior art presses, the force exerted by the second press unit, for example a counter force against movement of the press ram, is not directly dependent on the force exerted by the press ram. In the prior art the accumulators, such as gas cylinders, build up pressure in direct correlation to the force exerted by the press ram during its stroke. This system allows collecting energy exerted during a press stroke back into the system, as explained above. The force exerted by a second press unit, such as a cushion, can thus not be independently controlled from the force exerted by the press ram. The prior art thus provides a closed system which does not allow individual force control. This leads to the above explained disadvantages.

According to the inventive embodiments, on the other hand, a force control system is provided that allows individual control of the force exerted by the second press unit independent from the force exerted by the first press unit. This force control system is thus an open force control system. While the open control system used according to the disclosure forfeits at least partly the possibility to collect energy from the first driving movement of the first press unit back into the system, it gains the possibility of a flexible and independent force control. It is to be noted that the disclosure does not exclude also having accumulators, and thus being partly a closed force control system. However, at least a part of the force control system is open such that the inventive independent force control is possible. Of course, in a completely open system the inventive force control system can be without any accumulators for collecting energy from the movement of the first press unit.

The above embodiments thus allow to overcome the above explained disadvantages of the prior art system. They also provide greater flexibility, which in turn leads to better quality of the blanked parts. Flatness of the process material and the produced parts can be improved, higher part geometry accuracy can be achieved. Less blanking friction and lower necessary forces and consequently lower energy consumption can be realized. Tool stress, wear and tool breakage can be reduced, press and tool life can be increased. Blanking temperature and part temperature can be reduced. Part costs can be reduced as well as process noise level and pressure peaks in the force control system.

A further advantage achieved through the individual force control relates to an oscillation effect at the end of the blanking process. During a part blanking process the forces to be applied are typically built up during the elastic and plastic deformation phase to a maximum blanking force followed by a sharp force drop once the metal fibers of the process material are broken. This occurs usually when approximately one third of the process material thickness is blanked. This sharp decrease of the blanking force leads to an oscillation phase with a press frame spring action in known presses. Through the inventive individual force control this undesired spring action can be counter measured reliably.

Of course, the first press unit can also comprise force control means to control the force exerted by the first press unit during its first driving movement. For example, if the force exerted by the second press unit is changed, e.g. reduced, the force exerted by the first press unit could also be changed, e.g. reduced. To this end, the force control unit of the first press unit can also comprise closed loop control means as well as sensors of the above explained type whose measuring data is fed to a controller of the closed loop control means.

As already explained the first press unit can for example be a press ram, in particular a press ram that exerts the main blanking force. However, the first press unit can also be a different unit, such as a press cushion or the like.

According to a further embodiment the second press unit may comprise a second press drive comprising a hydraulic cylinder, wherein the force control unit comprises at least one control valve, preferably a proportional control valve, which is controlled by a controller of the force control unit, and which is configured to connect the barrel side and/or the piston side of the hydraulic cylinder to a tank for hydraulic fluid. This would be one example of an open force control system according to the disclosure. The connection of the hydraulic cylinder to the hydraulic fluid tank is effected according to the control status of the control valve, in particular the flow volume it lets pass to the tank according to its control of the controller. Of course, other open force control systems would also be possible according to the disclosure. The barrel side and the piston side may be pressurized before and/or during the second driving movement of the second press unit, in particular at all times during the second driving movement of the second press unit. The barrel side and the piston side may further be connected to each other by the control valve in particular at all times during the first driving movement of the first press unit. The pressurizing of the barrel side and the piston side may be effected for any cylinders driving any of the first and/or second press units.

Again, these embodiments allow for a particular fast and precise force control. The pre-pressurizing of both cylinder cavities pre-compresses the hydraulic fluid such that no reaction time is caused due to a necessary flow volume of the hydraulic fluid or the compressibility of the hydraulic fluid. By connecting the cylinder cavities to each other through the control valve and thus letting the hydraulic fluid flow between the cavities the pressure is maintained in the control system and need not be rebuilt each time a force shall be built up. The force control is thus quicker and more efficient than in the above explained prior art. Also, the above embodiments allow movement of the second press unit, such as a cushion, through the force control unit in both driving directions, by slightly depressurizing the corresponding cavity. More specifically, movement of the second press unit need also not rely on gravity.

According to a further embodiment the force control unit can be configured to control the force exerted by the second press unit during its second driving movement as a counter force against the force exerted by the first press unit during its first driving movement. This embodiment is particularly useful if the first press unit is a press ram that exerts the main blanking force. The second press unit can then for example be a cushion. As already explained the counter force can also be an impingement force, such as a V-ring force.

The first press drive of the first press unit and/or the second press drive of the second press unit can for example also be a servo-hydraulic drive or a mechanical drive or a servo-mechanical drive or an electrical drive or a pneumatic drive. Such drives may also be preloaded, as has been explained for hydraulic drives. For example in a servo-mechanical drive, such as a spindle drive driven by a servo motor, the spindle drive can be preloaded by preloading the spindle relative to a spindle nut of the spindle drive. In this manner the above explained advantages of a fast and efficient force control can also be realized for such other drive types.

Of course, also more than one first press units and/or more than one second press units can be provided according to the disclosure. All of the first and/or second press units can then be fitted with the inventive independent force control capabilities.

According to a further embodiment the counter force exerted by the second press unit during its second driving movement can be controlled such that it blocks the driving movement of the second press unit over a part of the first driving movement of the first press unit. According to this embodiment a particularly high counter force is exerted by the second press unit partially during the first driving movement of the first press unit. In this way the movement of the second press unit can be entirely blocked while other press units are still moving due to the inventive independent force control. Such an embodiment increases the process capabilities to produce complex parts. As an example, it would be possible for a cushion to exert a counter force first and at a certain position during the fine blanking cycle activate the blocking function such that the cushion will temporarily change its function from a cushion to a secondary positionally fixed ram function until the blocking function is again deactivated, the second press unit thus regaining its cushion function for example for the remaining part of the first driving movement. In this manner it is generally possible to change the function of press units flexibly. Such a blocking force permits to use compound tooling to generate complex parts instead of progressive transfer or rotary tooling. This again allows avoiding unbalanced forces usually present in progressive or transfer tooling by producing complex parts without progression of the process material. Accuracy of the produced parts can be improved and misfeeding of process material and positioning errors in progressive, transfer or rotary tools can be fully avoided.

According to a further embodiment the force exerted by the second press unit during its second driving movement is controlled such that it is constant over at least a part of the first driving movement of the first press unit, preferably over the greatest part of the first driving movement of the first press unit, more preferably essentially over the entire first driving movement of the first press unit. In particular, the force can be constant except a start ramp building up the force and an exit ramp building down the force. The blanking force exerted for example by a press ram as a first press unit can also be constant. By controlling the force exerted by the second press unit to be constant the above explained sharp force fluctuations, for example after the metal fibers of the process material break during blanking, can be avoided. This avoids for example the above explained spring effect and further increases part quality. Frame and tool fatigue can be reduced as well as the necessary blanking force, which in turn reduces power consumption.

According to a further embodiment the force exerted by the second press unit during its second driving movement comprises an array of different forces during the first driving movement of the first press unit. The different forces may be provided for example during the actual fine blanking step, i.e. when the cutting of the process material takes place. The different forces may also be provided for longer or shorter than the actual fine blanking step. Such different forces may be provided in the form of a continuous force curve. The different forces may also be provided in the form of discrete force steps. Also a combination of discrete force steps and a continuous force curve may be provided. The forces may increase and/or decrease once or several times during the second driving movement of the second press unit.

For example, the force exerted by the second press unit during its second driving movement can be controlled such that it rises during the beginning of the first driving movement of the first press unit until reaching a maximum value. Preferably it may then decrease during the remaining first driving movement of the first press unit. By suitably choosing the force decrease it is possible to achieve a blanking process where the force necessary to be exerted by the press ram can be reduced to a minimum while at the same time negative effects of sharp force changes, such as a spring oscillation effect, can be securely avoided. The process can be made smoother and more energy efficient at maximum part quality.

According to a further embodiment the force exerted by the first press unit during its first driving movement may be controlled such that it is constant or rises during the beginning of the first driving movement until reaching a maximum value. After this point the force exerted by the first press unit preferably decreases for the remaining first driving movement of the first press unit, and/or that the force starts the first driving movement with a maximum value and subsequently decreases, preferably decreases progressively, over the remaining first driving movement of the first press unit. The maximum force value may be the blanking force required to blank the process material. The movement speed of the first press unit may be constant at least during the actual blanking of the process material. The speed and force may, as already explained, be controlled by the inventive closed loop control.

According to a further embodiment the force exerted by the second press unit during its second driving movement can be reduced to zero over at least a part of the first driving movement of the first press unit. This force control strategy is particularly useful with regard to the impingement force, such as a V-ring force. Thus, for example the impingement force exerted by a unit comprising impingement means can be reduced to zero over at least a part of the first driving movement of the first press unit. More specifically, the impingement force can first be at a higher level to securely clamp the process material for blanking, and can subsequently be reduced to zero, thus eliminated completely, such that process material surrounding the area forming the part to be blanked can flow freely. This reduces blanking stress in the material forming the future part as such stress is transferred into the surrounding process material forming future scrap. The blanked part quality, for example flatness and geometry accuracy can be further improved in this way. Also energy consumption can be reduced as well as the necessary forces and temperatures, leading inter alia to longer tool life.

According to a further embodiment the force exerted by the second press unit during its second driving movement can be inverted over at least a part of the first driving movement of the first press unit. For example a counter force, such as an impingement force exerted by a unit comprising impingement means, can first be reduced to zero and then be inverted to a force acting in the same direction as the force exerted by the first press unit. Again, this embodiment can be particularly advantageous with regard to an impingement force, such as a V-ring force. For example impingement means, such as a V-ring, can in this manner be retracted from the process material after having clamped the process material for blanking and while the blanking process is still ongoing with such a force control. This leads to a completely free process material flow between the area forming the future part and the surrounding area forming future scrap such that blanking stress can dissipate freely into the future scrap material. It also minimizes the roll over the part. Further, the ram force needed to blank the part as well as the process temperature and the blanking stress can be reduced. Part quality can thus be further increased as well as energy efficiency of the fine blanking press. Tool and part stress can be further reduced. This is particularly advantageous in such blanked parts that subsequently need to go through a heat treatment process as blanking stress generates part distortion which leads to reduced part accuracy in heat treatment. These disadvantages can be avoided according to the disclosure.

As explained above due to the flexibility of the inventive force control every press unit can also alternate its particular function with other units, for example alternating between a cushion and a ram function. Such alternation is possible also several times during the same press cycle, the press cycle time being the only limitation. Of course this can also be applied to a ram changing its function to a cushion over part of the press cycle.

As explained above due to the flexibility of the inventive force control the second press unit can start an opposite movement under a synchronized or a delayed movement with regard to the first press unit during the first driving movement of the first press unit and/or after the first press unit has finished its first driving movement. This movement can in particular be controlled by the force control unit.

It is also possible that the second press unit carries out a movement in the direction of the first driving movement of the first press unit before and at least until the first press unit contacts the second press unit. Again, this movement can in particular be controlled by the force control unit. According to this embodiment a pre-acceleration movement can be carried out to avoid an initial shock when the first press unit, for example a press ram, first contacts the second press unit, for example a cushion, that is already exerting a counter force. This pre-acceleration movement of the second press unit, preferably effected through the inventive force control, can comprise a ramp-up movement speed. In this way a particularly smooth contact with the already moving first press unit can be achieved. The process becomes smoother and processing speeds can be increased. Of course also a deceleration of the movement of the second press unit is possible, as desired.

According to a further embodiment of the inventive method at least two of the inventive force controls and/or movements can be carried out in the same fine blanking process step, in particular during the production of the same blanked part. More specifically, the above explained embodiments of variable force control, namely a constant force, a decreasing and/or increasing force, a force reduction to zero. an inverted force, a blocking force and/or any variable function force can be combined in one press cycle.

The inventive method can be carried out using the inventive fine blanking press. Correspondingly, the inventive fine blanking press, and in particular its force control unit, can be configured to carry out the inventive method, in particular the above explained embodiments of force control.

BRIEF DESCRIPTION OF THE DRAWINGS

Embodiments of the disclosure are explained in more detail in the following by reference to schematic drawings.

In the drawings the same reference numerals refer to identical or functionally identical parts.

DETAILED DESCRIPTION OF THE DISCLOSURE

Figure 1:
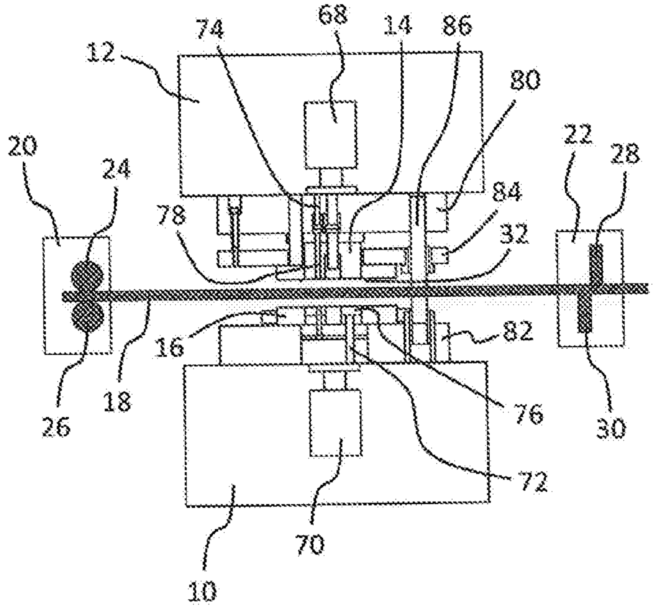
FIG. 1. shows an inventive fine blanking press.

The fine blanking press according to the disclosure shown in FIG. 1 comprises a press ram 10, constituting a first press unit, and a working table 12 arranged opposite the blanking ram 10. A first press drive not further shown in FIG. 1 is provided for driving the press ram 10 in a first driving movement during a fine blanking process step, in FIG. 1 upwards and downwards. Integrated into the press ram 10 and the working table 12 are cushions 68, 70, which are connected to a blanking tool arranged between the press ram 10 and the working table 12 through transfer pins 72, 74. The blanking tool further comprises press punch 14, which may be positionally fixed together with the working table 12, and die 16, and moves together with the press ram 10. The blanking tool further comprises ejectors 76, 78, set plates 80, 82, press plate 84 and a tool guiding 86. Punch 14 and die 16 blank parts out of a sheet metal 18 fed to the process zone between the press ram 10 and the working table 12 by a feeding unit 20, in the example shown in FIG. 1 in a direction from left to right. A chopping unit 22 is provided downstream of the process zone for chopping scrap process material after the fine blanking process. In the shown example, the feeding unit 20 comprises two rotationally driven feeding rollers 24, 26 arranged on opposite sides of the process material 18. Of course also other feeding units are possible, for example gripper feeders or other feeders. The chopping unit 22 comprises axially driven cutters 28, 30 arranged on opposite sides of the process material 18 for chopping the scrap process material. An impingement ring 32, like a V-ring, is further shown schematically for securely holding the process material 18 during the fine blanking process. The impingement ring 32 may in particular be provided on the press plate 84 of the blanking tool driven by one of the cushions. This general design of a fine blanking press is known to the skilled person and shall not be explained in more detail.

FIG. 1 shows the open condition of the fine blanking press in which the process material 18 can be fed into the process zone. Subsequently, the press ram 10 can be moved upwards against the working table 12. The process material 18 is thus clamped by the blanking tool between the press ram 10 and the working table 12 and securely held in place by the impingement ring 32. Subsequently, the press ram 10 can be further driven against the working table 12, punch 14 and die 16 thus blanking a part out of the process material 18. The working table 12 may exert a counter force against the press drive of the blanking ram 10, for example through a cushion, in particular for clamping the impingement ring 32 into the process material 18 to improve clamping of the process material 18. After the explained movements the press ram 10 can be moved downwards and the fine blanking press is opened again to eject the produced part. This operation of a fine blanking press is also generally known to the skilled person.

In the following embodiments of inventive force control units shall be explained which may be incorporated into the fine blanking press shown in FIG. 1.

Figure 2:
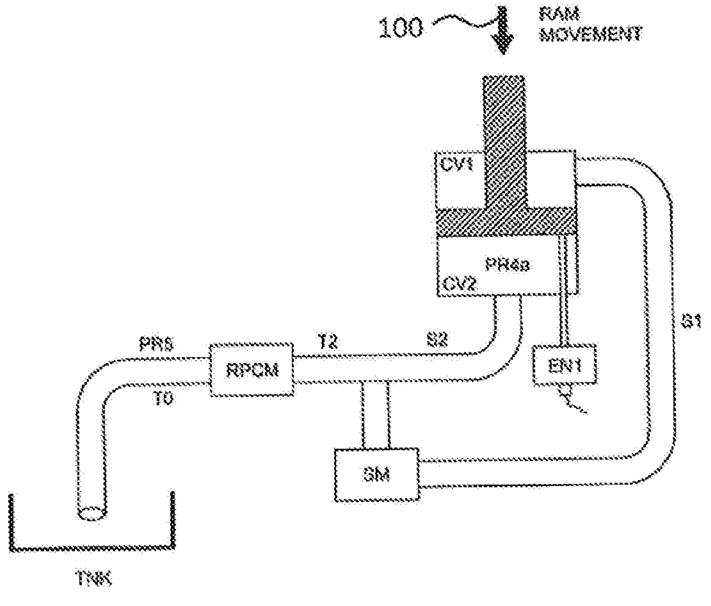
FIG. 2. shows an embodiment of an inventive force control unit of an inventive fine blanking press in a first operating condition, FIG. 3. shows the force control unit of FIG. 2 in a second operating condition, FIG. 4. shows a further embodiment of an inventive force control unit of an inventive fine blanking press, FIG. 5. shows a force exerted by a second press unit according to an embodiment, FIG. 6. shows a force exerted by a second press unit according to a further embodiment, FIG. 7. shows a force exerted by a second press unit according to a further embodiment, and FIG. 8. shows a force exerted by a second press unit according to a further embodiment.

In FIG. 2 a hydraulic cylinder is shown having a first cylinder cavity CV1, forming a piston side, and a second cylinder cavity CV2, forming a barrel side. The first cylinder cavity CV1 is connected via a hydraulic line S1 to a controller SM and through the controller SM via a return pressure control module RPCM to a tank TNK. The second cylinder cavity CV2 is connected via hydraulic line S2 and return pressure control module RPCM to the tank TNK. The controller SM represents at least a control valve which is directly connected to cylinder cavities CV1 and CV2 while connecting both cavities CV1 and CV2 between themselves or any or both of them directly to the tank TNK according to the process requirements in terms of pressures, fluid flow, fluid viscosity, fluid temperature and any other relevant parameters during the fine blanking cycle while depending on the needed hydraulic design they can also be connected to an external additional return pressure control module RPCM or integrated inside the same valve the RPCM module, being this valve a controlled valve, being preferably a high dynamic proportional valve, or a servo valve, or a proportional piezoelectric valve, or any other type of valve. The inventive force control can be applied to any forces exerted during the fine blanking process by means of the controller SM together with suitable valves or by the controller SM acting as a control valve, as explained. T0 and T2 denote tank lines. A position sensor EN1, for example an encoder, is provided for detecting the position of the cylinder piston. The hydraulic cylinder shown in FIG. 2 is connected to a first press unit and/or a second press unit of the fine blanking press, such as one of the cushions 68, 70, which is driven in a second driving movement by the first driving movement of a first press unit, in the shown example the press ram 10 exerting the main blanking force. The second driving movement of the second press unit displaces the cylinder piston of the hydraulic cylinder, as visualized in FIGS. 2 and 3 by arrow 100. Data from the position sensor EN1 is fed to the controller SM which may carry out a closed-loop control on basis of the sensor measuring data. The position sensor of the second press unit may be connected to the controller SM and the position sensor of the first press unit may be connected to the controller SM. A closed loop control may then be based on the position of the first press unit, e.g. a press ram. The complete press cycle may be managed according to the position of the first press unit. However, also other press units may serve as reference for a position control. Of course the SM controller could also be connected to other external sensors not shown in FIG. 2, or the SM controller may incorporate internally position sensors or other needed sensors. Possible sensors include for example pressure sensors, viscosity sensors, flow sensors, temperature sensors and any other needed sensors depending on the design configuration. Data from such sensors may then be fed again to controller SM which may carry out a closed-loop control on basis of the sensor measuring data. As explained the fine blanking press may have more than one first press unit and more than one second press unit. Thus, all or some sensors from all or some press units may be connected to corresponding controllers, for example controller SM or the below explained main control module CM. In case there is more than one controller the controllers may communicate between themselves where it is needed for the proper control.

Figure 3:
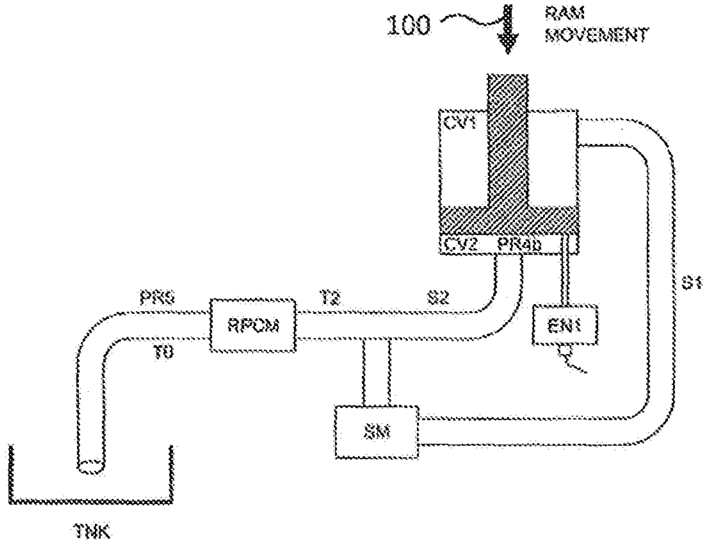

When the piston is pushed in by the press ram movement, as shown in FIG. 3, the volume of the second cylinder cavity CV2 is reduced and the volume of the first cylinder cavity CV1 is increased. The amount of volume change is known to the controller SM through the sensor data of the position sensor EN1. On this basis the controller SM can control the return pressure control module RPCM, which comprises at least a control valve, for example a proportional control valve, such that it can provide a desired volume flow between the hydraulic cylinder and the tank TNK. In this manner for example pressure PR4*a* and PR4*b* in the second cylinder cavity CV2 can be maintained at a constant value despite the movement effected between FIGS. 2 and 3. Therefore, a counter force exerted via the hydraulic cylinder by the second press unit against the force exerted by the press ram 10 can also be kept constant. Hydraulic pressures PR4*a* and PR4*b* can for example be unequal to hydraulic pressure PR5, in particular higher than hydraulic pressure PR5.

Figure 5:
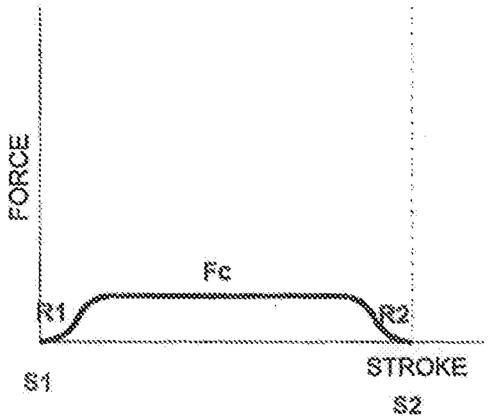

A corresponding force diagram is shown in FIG. 5, where the force is shown over the stroke, in this case between the operating condition shown in FIG. 2, denoted by stroke position S1, and the operating position shown in FIG. 3, denoted by stroke position S2. R1 denotes a start ramp building up the constant force Fc and R2 denotes an exit ramp building down the constant force Fc. Between the ramps R1 and R2 the force is held constant at force value Fc.

Figure 6:
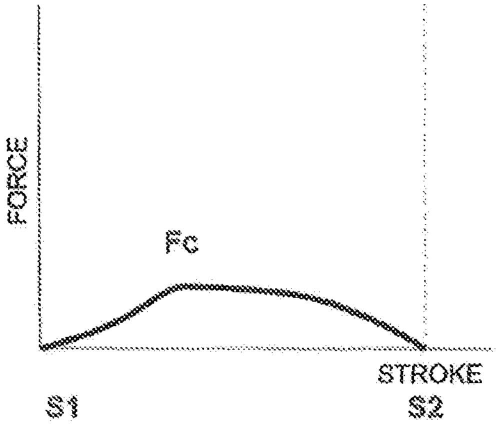

In the same way a force between stroke positions 51 and S2, as shown in FIG. 6, can be realized. In this case the force is built more slowly up to force value Fc and after reaching force value Fc is decreased towards the end position S2 of the stroke.

Figure 7:
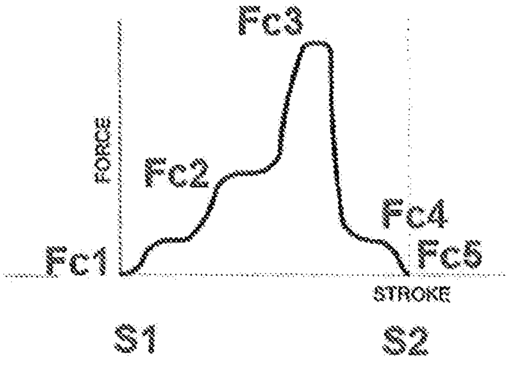
Figure 8:
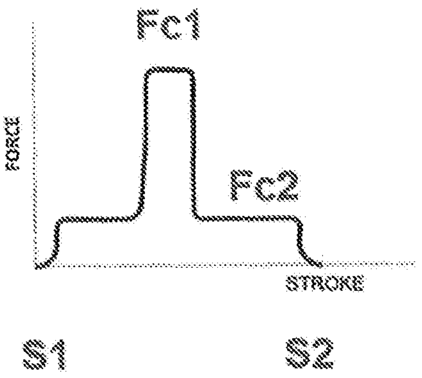

The return pressure control module RPCM can also comprise a pump for pumping hydraulic fluid from the tank TNK to the first and/or second cylinder cavity CV1, CV2. The pump can also be controlled by controller SM, as well as corresponding valves for feeding hydraulic fluid from tank TNK to the first cylinder cavity CV1 or the second cylinder cavity CV2. For example by feeding hydraulic fluid from the tank TNK to the second cylinder cavity CV2 during the press ram movement, a counter force exerted by the second press unit can be increased substantially. With such an embodiment, the force exerted by the second press unit can be controlled variably and with great flexibility. Examples of possible force profiles between stroke positions Si and S2 are shown in FIGS. 7 and 8. In FIG. 7 the counter force exerted by the second press unit is first increased in a ramp to a force Fc1, subsequently to a force Fc2, subsequently to a higher force Fc3 and is after that reduced sharply to a force Fc4 and finally Fc5. In the embodiment according to FIG. 8 the force is first increased in a ramp to a force Fc2, which is maintained constant for a first time interval, subsequently the force is increased to a blocking force Fc1 blocking further movement of the second press unit, e.g. one of the cushions 68, 70, thus inverting the function of the cushion 68, 70 to the function of a second ram, and is subsequently reduced again to force Fc2, where it is kept constant for the remaining cycle of the stroke until an exit ramp, thus inverting the function of a second ram to a cushion function again.

Figure 4:
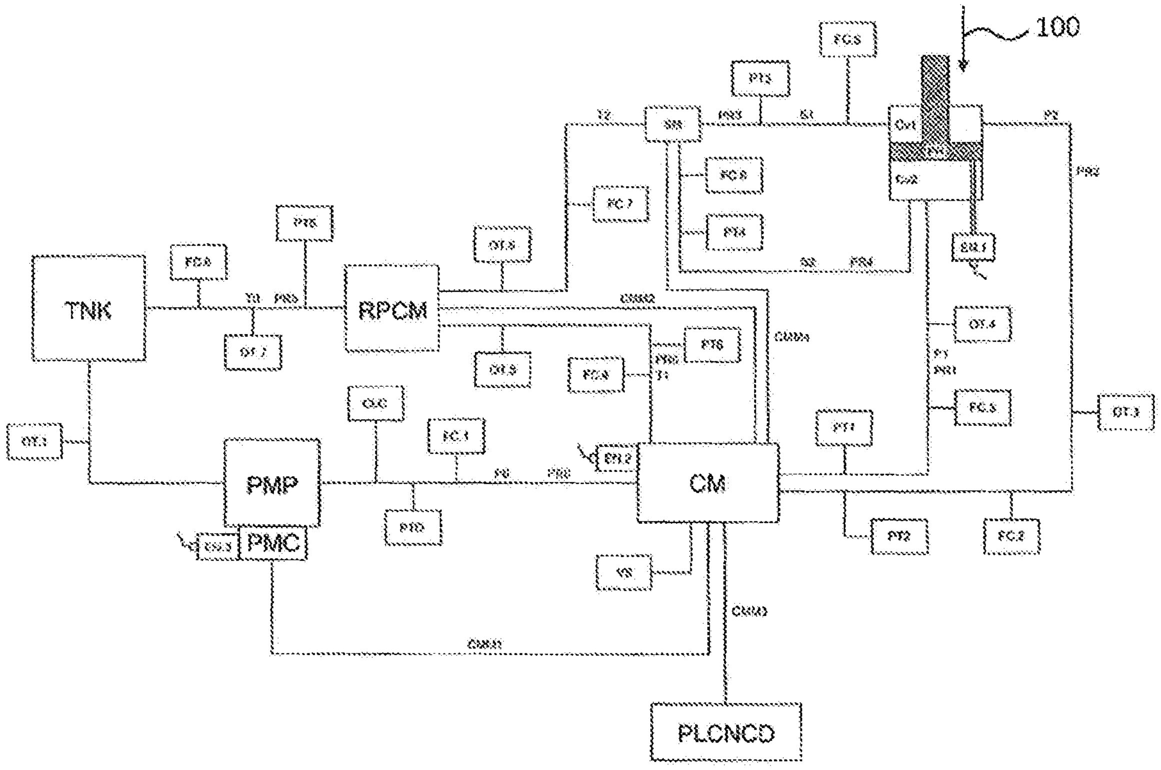

By referring to FIG. 4 a further detailed embodiment of an inventive force control unit of the inventive fine blanking press shall be explained.

FIG. 4 shows a further enhanced force control unit based on components already explained with regard to FIGS. 2 and 3. More specifically, TABLE I below summarizes the various components shown in FIG. 4.

TABLE I

| | |
|---|---|
| TNK: | Fluid tank |
| PMP: | Pump |
| PMC: | Pump module control |
| CM: | Main control module |
| SM: | Control module |
| CLC: | Cleanness control sensor |
| RPCM: | Return Pressure control module |
| PLCNCD: | PLC or CNC control device |
| VS: | Viscosity sensor |
| P0 . . . P2 . . .: | Pressure lines |
| T0 . . . T2 . . .: | Tank lines |
| CMM1 . . . CMM3 . . .: | Communication channels |
| CV1: | Cylinder cavity no1 |
| CV2: | Cylinder cavity no2 |
| PT0 . . . PT5 . . .: | Pressure transducers |
| OT.1 . . . OT.7 . . .: | Temperature sensors |
| EN.1 . . . EN.3 . . . | Position sensors |
| FC.1 . . . FC.8 . . .: | Flow control sensors |
| S1 . . . S2 . . .: | Hydraulic lines |
| PR0 . . . PR2 . . .: | Fluid pressures |

The sensors shown in FIG. 4 are used for a closed loop control carried out by the main control module CM. The PLC or CNC control device is used for introducing process parameters by a press operator. The main control module controls the force control system on this basis. Pump PMP is connected to tank TNK, wherein pump PMP is controlled by pump module control PMC which is also connected to the main control module CM by communication channels CMM. The main control module is further connected to hydraulic cylinder cavities CV1 and CV2. This could be done directly or through an additional return pressure control module RPCM connected to tank TNK. At the same time the main control module is connected to the control module SM which is also directly connected to cylinder cavity CV1 and CV2, and connected to tank TNK through the return pressure control module RPCM. Control Module SM represents at least a control valve which is directly connected to cylinder cavities CV1 and CV2, while connecting both cavities CV1 and CV2 between themselves or any or both of them directly to the tank TNK according to the process requirements in terms of pressures, fluid flow, fluid viscosity, fluid temperature and any other relevant parameters during the fine blanking cycle. Depending on the needed hydraulic design it can also be connected to an external additional return pressure control module RPCM or integrated inside the same valve the RPCM module, being this valve a controlled valve, being preferably a high dynamic proportional valve, or a servo valve, or a proportional piezoelectric valve, or any other type of valve.

As indicated the main control module CM receives process data introduced by the press operator from the PLC or CNC control device PLCNCD. On this basis the main control module CM establishes an initial pump fluid pressure and flow taking in consideration measuring data on hydraulic fluid temperature, fluid viscosity, fluid cleanness for example. It may also consider further factors such as valve reaction times (delay times), in order to compensate such delays in advance and to make the force control unit follow very precisely the process parameters introduced into the PLCNCD device by the press operator. As part of the closed-loop control the main control module CM monitors all system sensors and adjusts all system components according to the system status. To this end the main control module CM is connected via communication channels CMM to the relevant system components and sensors.

Control module SM and return pressure control module RPCM are both directly controlled by the main control module CM such that the desired hydraulic fluid pressure values are at all times maintained in cylinder cavities CV1 and CV2. As explained, hydraulic cylinder with cylinder cavities CV1 and CV2 may for example be connected to one of the cushions 68, 70 and during a first driving movement of the press ram 10 may for example exert a desired counter force, including for example an impingement force, such as a V-ring force. This control is effected, as explained above with regard to FIGS. 2 and 3, by a controlled leaking of hydraulic fluid from cylinder cavity CV2 through control module SM and return pressure control module RPCM to tank TNK while at the same time for example press ram is pushing in the cylinder piston and forcing the fluid to leak to the tank, as visualized in FIG. 4 again by arrow 100.

For example main control module CM considers position changes of the cylinder piston through measuring data from position sensor EN.1 as well as pressure PR1 inside cylinder cavity CV2 through pressure sensor PT1. Based on this measuring data main control module CM controls control module SM such that the desired force is exerted by the second press unit, such as a cushion 68, 70. As explained, in this manner force profiles such as shown in FIGS. 5 to 8 can be realized.

While in the above explained mode the cushion 68, 70 is a passive cushion, the embodiment of FIG. 4 also allows implementing an active cushion 68, 70. To this end, main control module CM can adjust the pump fluid pressure PR0 monitored by pressure sensor PT0 and fluid flow monitored by flow control sensor FC.1 through pump control module PMC and pump PMP to achieve a desired pressure PR1 monitored by pressure sensors PT1 and PT4 and desired flow monitored by flow control sensors FC.3 and FC.6 to achieve the desired force. This force, which can in particular be a counter force, including an impingement force or V-ring force, is maintained before the press ram 10 begins its first driving movement and thus before it starts to push in the cylinder piston. In this way the cushion 68, 70 is preloaded. Once the press ram 10 begins its driving movement pressure PR1 will increase sharply while at the same time position sensor EN.1 will detect piston movement. Based on measuring data of the corresponding sensors PT4, PT1 and EN.1 the main control module CM will control pump module control PMC and thus pump PMP to reduce the pressure and fluid flow to a minimum or even zero while at the same time controlling control module SM and thus return pressure control module RPCM to open a corresponding valve connecting cylinder cavity CV1 and CV2 and to leak the desired amount of fluid to tank TNK, as explained above, to obtain the desired force profile.

Due to the closed-loop control any change of any monitored parameters will be detected and can be addressed immediately by the main control module CM which will readjust the force control system correspondingly.

Once the press ram 10 has achieved its final blanking position and the press ram movement starts to reverse to open the blanking tool, the main control module CM can apply corresponding fluid flow and pressure to cylinder cavity CV2 to fully extend cylinder piston. To that end main control module CM can close return fluid line T0 to tank TNK by closing the controlled valve inside return pressure control module RPCM and flushing hydraulic fluid from cavity CV1 to CV2 at the same time, controlled by control module CM, which will introduce new fluid under pressure PR1 into cavity CV2 through pressure line P1, controlled by pressure sensor PT1 and as safety redundant controlled by pressure sensor PT4, as well as control of piston movement by position sensor EN.1.

In addition control module SM and main control module CM may have a second safety tank line T1 connecting pressure lines P1, P2 and P0 to tank TNK through return pressure control module RPCM. In this manner cylinder damage in case of a valve or sensor failure can be avoided due to a second safety fluid tank line.

REFERENCE NUMERAL LIST

10 press ram
12 working table
14 press punch
16 die
18 sheet metal
20 feeding unit
22 chopping unit
24 feeding rollers
26 feeding rollers
28 cutters
30 cutters
32 impingement ring
68 cushions
70 cushions
72 transfer pins
74 transfer pins
76 ejectors
78 ejectors
80 set plates
82 set plates
84 press plate
86 tool guiding
100 arrow

The invention claimed is:

1. A fine blanking press comprising:

a first press unit comprising at least one of a press ram, a press cushion, and a chopping unit;

a first press drive configured to drive a first press unit in a first driving movement during a fine blanking process step;

a second press unit comprising at least one of a press counter ram, a working table, a press cushion, a press plate and a press punch, wherein the second press unit is configured to be driven in a second driving movement at least partially during driving movement of the first press unit;

a force control unit comprising at least one sensor operative to generate measuring data, wherein the force control unit is configured to exert a force against a primary force exerted by the first press unit during the first driving movement; and a controller configured to receive the measuring data collected by the at least one sensor and further configured to adjust one or more press components based on the received measuring data, wherein the first press drive is configured to drive the first press unit in different movement steps, including: (i) an approach step, during which the first press unit approaches a process material to be fine blanked, (ii) the fine blanking step, during which the process material is fine blanked, and (iii) a return step, during which the first press unit returns to an initial position, and wherein the controller adjusts the first press unit such that the first press unit is driven at a constant speed at least during the fine blanking step, wherein the force control unit is configured to exert a counterforce against a force exerted by the first press unit during a return step of the press unit.

2. The fine blanking press according to claim 1, wherein the first press drive includes-a hydraulic cylinder, and the force control unit includes at least one proportional control valve, which is configured to connect at least one of a barrel side and a piston side of the hydraulic cylinder to each other.

3. The fine blanking press according to claim 2, wherein each of the at least one of the barrel and the piston sides are pressurized before, and/or during, the first driving movement of the first press unit.

4. The fine blanking press according to claim 2, wherein the force control unit is configured to control a force exerted by the second press unit as a counter force against the force is exerted by the first press unit during the first driving movement.

5. The fine blanking press according to claim 4, wherein the force control unit is configured to control a force exerted by the second press unit independently from the force exerted by the first press unit during the first driving movement.

6. The fine blanking press according to claim 4, wherein the second press unit is driven in the second driving movement at least partially by the first driving movement of the first press unit.

7. The fine blanking press according to claim 4, wherein the second press unit comprises a second press drive comprising a hydraulic cylinder, and the force control unit comprises at least one proportional control valve configured to connect the at least one of the barrel side and the piston side of the hydraulic cylinder to a tank for hydraulic fluid.

8. The fine blanking press according to claim 7, wherein the at least one of the barrel and the piston sides are pressurized before and/or during the second driving movement of the second press unit.

9. The fine blanking press according to claim 7, wherein the at least one of the barrel and the piston sides are connected to each other by the control valve.

10. The fine blanking press according to claim 1, wherein the at least one sensor comprises at least one position sensor configured for measuring the position of the first press unit, and wherein the controller is configured to receive position data measured by the at least one position sensor and adjust the position of the first press unit on basis of the measured position data.

11. The fine blanking press according to claim 1, wherein the at least one sensor comprises at least one sensor measuring the force exerted by the first press unit and/or the counter force controlled by the force control unit, and wherein the controller is configured to adjust one of the forces exerted by the first press unit and the counter force controlled by the force control unit on basis of the measured force data.

12. A method for operating a fine blanking press, comprising:

driving a first press unit in a first driving movement during a fine blanking process step, wherein the first press unit comprises at least one of a press cushion, a press ram and a chopping unit;

driving a second press unit in a second driving movement at least partially during the first driving movement of the first press unit, wherein the second press unit comprises at least one of a press cushion, a press ram and a chopping unit;

exerting a counter force against a force exerted by the first press unit during the first driving movement of the first press unit;

collecting measuring data using at least one sensor; and adjusting the first press unit based on the measuring data such that the first press unit is driven at a constant speed at least during the fine blanking step, exerting the counter force against a force exerted by the first press unit during a return movement of the first press unit.

13. The method according to claim 12, wherein the at least one sensor comprises at least one position sensor measuring a position of the first press unit, and wherein the first press unit is adjusted on the basis of the measured position data.

14. The method according to claim 12, wherein the first press unit is driven during a fine blanking process step in one of various movement steps, including: (i) an initial approach step, during which the first press unit approaches a process material to be fine blanked, (ii) a fine blanking step, during which the process material is fine blanked, and (iii) a return step, during which the first press unit returns to an initial position before the initial approach step.

15. The method according to one of claim 12, wherein the at least one sensor comprises at least one sensor measuring one of the forces exerted by at least one of the first press unit and the counter force controlled by a force control unit, and wherein an adjustment of the forces exerted by one of the first press unit and the counter force controlled by the force control unit is carried out on basis of the measured force data.

16. The method according to claim 12, further comprising driving the second press unit in the second driving movement at least partially by the first driving movement of the first press unit.

17. The method according to claim 12, wherein the counter force is exerted by a first press drive of the first press unit.

18. The method according to claim 12, wherein a counter force is exerted by the second press unit.

19. The method according to claim 18, wherein the counter force exerted by the second press unit is controlled such that the counter force blocks the driving movement of the second press unit over a part of the first driving movement of the first press unit.

20. The method according to claim 12, wherein a force exerted by the second press unit during the second driving movement is controlled independently from the force exerted by the first press unit during the first driving movement.

21. The method according to claim 20, wherein the force exerted by the second press unit during the second driving movement is controlled such that the force is constant over at least a part of the first driving movement of the first press unit.

22. The method according to claim 21, wherein the force exerted by the second press unit during the second driving movement is controlled such that the force follows an array of different forces during the first driving movement of the first press unit.

23. The method according to claim 21, wherein the force exerted by the first press unit during the first driving movement is controlled such that the force is constant during a beginning of the first driving movement until reaching a maximum value and decreases for the remaining part of the first driving movement of the first press unit and the force starts the first driving movement with a maximum value and decreases over a remainder of the first driving movement of the first press unit.

24. The method according claim 23, wherein the force exerted by the second press unit during the second driving movement is controlled such that the force is reduced to zero over at least a part of the first driving movement of the first press unit.

25. The method according to claim 24, wherein the force exerted by the second press unit during the second driving movement is controlled such that the force is inverted over at least a part of the first driving movement of the first press unit.

26. The method according to claim 25, wherein the second press unit carries out an opposite movement, with regard to the first press unit during the first driving movement of the first press unit and after the first press unit has finished the first driving movement.

27. The method according to claim 26, wherein the second press unit carries out a movement in a direction of the first driving movement of the first press unit until at least the first press unit contacts the second press unit.

* * * * *